United States Patent [19]

Murayama

[11] Patent Number: 5,202,771
[45] Date of Patent: Apr. 13, 1993

[54] IMAGE DATA COMPRESSION SYSTEM AND FACSIMILE MACHINE EMPLOYING THE IMAGE DATA COMPRESSION SYSTEM

[75] Inventor: Noboru Murayama, Tokyo, Japan

[73] Assignee: Ricoh Company, Ltd., Tokyo, Japan

[21] Appl. No.: 742,534

[22] Filed: Aug. 8, 1991

Related U.S. Application Data

[63] Continuation of Ser. No. 385,085, Jul. 26, 1989, abandoned.

[30] Foreign Application Priority Data

Aug. 8, 1988 [JP] Japan .................................. 63-196126

[51] Int. Cl.$^5$ ............................................. H04N 1/41
[52] U.S. Cl. ................................... 358/426; 358/261.1
[58] Field of Search .................. 358/426, 261.1, 261.2, 358/261.3, 133, 427

[56] References Cited

U.S. PATENT DOCUMENTS 4,839,738  6/1989  Kaku et al. ............................ 358/426
4,860,114  8/1989  Horikawa et al. ................... 358/426

Primary Examiner—Stephen Brinich
Assistant Examiner—Thomas D. Lee
Attorney, Agent, or Firm—Oblon, Spivak, McClelland, Maier & Neustadt

[57] ABSTRACT

An image data compression system detects from an input image data a transition edge of a picture element on a scanning line where the picture element undergoes a transition from white to black or vice versa. A direction change quantity between a direction of a transition edge of a picture element on an object scanning line and a direction of a transition edge of a picture element on a reference scanning line which precedes the object scanning line is detected, and this direction change quantity is coded into a directional change code which is output as a compressed image data of the input image data.

10 Claims, 3 Drawing Sheets

IMAGE DATA COMPRESSION SYSTEM AND FACSIMILE MACHINE EMPLOYING THE IMAGE DATA COMPRESSION SYSTEM

This application is a continuation of application Ser. No. 07/385,085, filed Jul. 26, 1989 now abandoned.

BACKGROUND OF THE INVENTION

The present invention generally relates to image data compression systems and facsimile machines employing the image data compression system, and more particularly to an image data compression system which compresses a quantity of data to be transmitted when transmitting image data such as characters and patterns and a facsimile machine employing the image data compression system.

A modified READ (MR) coding scheme is used as a standard two-dimensional data compression system of facsimile machines. A description will be given of a case where a character "A" having a pattern shown in FIG. 1 is coded by the MR coding scheme.

For the sake of convenience, FIG. 1 shows a screen having 16 picture elements along a horizontal axis (X-axis) and 11 picture elements along a vertical axis (Y-axis). It is assumed that picture elements constituting a column on the right of a rightmost column within the screen are all black picture elements as indicated by a hatching.

The pattern of the character "A" is developed on the screen as a graphic, and MR codes shown in the following Table 1 are obtained by scanning this screen in the direction of the X-axis.

TABLE 1

| Line No. | Code Sequence | No. of Bits |
|---|---|---|
| 1 | V(0) | 1 |
| 2 | H{W(7)B(2)}V(0) | 10 |
| 3 | V(0)V(0)V(0) | 3 |
| 4 | VL(1)VR(1)V(0) | 7 |
| 5 | VL(1)VR(1)V(0) | 7 |
| 6 | VL(1)H{B(3)W(2)}VR(1)V(0) | 16 |
| 7 | VL(1)VL(1)VR(1)VR(1)V(0) | 13 |
| 8 | VL(1)PVR(1)V(0) | 11 |
| 9 | VL(1)H{B(4)W(6)}VR(1)V(0) | 17 |
| 10 | V(0)VL(1)VR(1)V(0)V(0) | 9 |
| 11 | PP | 8 |

The MR code is basically a vertical code. The MR coding scheme codes a shift quantity of an X-axis address of a transition point where a picture element undergoes a transition from white to black or black to white on a present scanning line which is being processed when compared with an X-axis address of a transition point where a picture element undergoes a transition from white to black or black to white on a previous scanning line which is immediately prior to the present scanning line.

In the Table 1, a value m in brackets "( )" indicates the shift quantity, where $m \geq 3$. Hence, V(0) indicates that there is no shift. On the other hand, VR(m) and VL(m) respectively indicate shifts to the right and left. In addition, H indicates that a modified Huffman (MH) coding scheme is applied. The MH coding scheme is used when the shift quantity is greater than "3" and a new pair of transition points where the picture element undergoes a transition from white to black or black to white is generated. W(p) and B(p) of the MH code respectively indicate that p consecutive picture elements are white and p consecutive picture elements are black. P indicates that two codes forming a pair are deleted.

Each number under the column "No. of Bits" in the Table 1 indicates a total number of bits of the corresponding code sequence under the column "Code Sequence". The following Table 2 shows the correspondence of the codes and the number of bits.

TABLE 2

| Code Name | Code | No. of Bits |
|---|---|---|
| Pass | P | 0001 | 4 |
| MH Code | H | 001+MH(p1)+MH(p2) | 3+(H1+H2) |
| MR Code | V(0) | 1 | 1 |
| | VR(1) | 011 | 3 |
| | VR(2) | 000011 | 6 |
| | VR(3) | 0000011 | 7 |
| | VL(1) | 010 | 3 |
| | VL(2) | 000010 | 6 |
| | VL(3) | 0000010 | 7 |

In the Table 2, second and third terms under the column "Code" of the MH code respectively are MR codes indicating the numbers of consecutive white picture elements and consecutive black picture elements.

In a general graphic, the shift quantity of the X-axis address of the transition point of the picture element is in many cases constant and continuous. For example, in the case of the character "A" shown in FIG. 1, the shift quantity is 0 or $\pm 1$ and the same shift quantity such as $\pm 1$ continues between many scanning lines.

However, as described above, the MR code is basically a vertical code. The MR coding scheme codes a shift quantity of an X-axis address of a transition point (or edge) where a picture element undergoes a transition from white to black or black to white on an object scanning line when compared with an X-axis address of a transition point (or edge) where a picture element undergoes a transition from white to black or black to white on a reference scanning line. For this reason, when transmitting the image data, it is necessary to transmit two kinds of data respectively indicating a value of the shift quantity (that is, a difference between the X-axis addresses) and a direction of the shift. Therefore, there is a problem in that there is a limit to further reducing a quantity of data which needs to be transmitted when making an image data transmission.

SUMMARY OF THE INVENTION

Accordingly, it is a general object of the present invention to provide a novel and useful image data compression system and a facsimile machine employing the image data compression system in which the problems described above are eliminated.

Another and more specific object of the present invention is to provide an image data compression system comprising first detecting means supplied with an input image data for detecting a transition edge of a picture element on a scanning line where the picture element undergoes a transition from white to black or vice versa, second detecting means coupled to the first detecting means for detecting an inclination change quantity between a direction of a transition edge of a picture element on an object scanning line and a direction of a transition edge of a picture element on a reference scanning line which precedes the object scanning line, and coding means coupled to the second detecting means for coding the inclination change quantity into an inclination change code which is output as a compressed image data of the input image data. According to the image data compression system of the present invention, it is possible to obtain a high data compression rate by noting that the shift quantity of the transition points of the picture elements on two mutually adjacent scanning lines is constant in many cases.

Still another object of the present invention is to provide a facsimile machine comprising reading means for reading a document image and outputting an input image data, first detecting means supplied with the input image data for detecting a transition edge of a picture element on a scanning line where the picture element undergoes a transition from white to black or vice versa, second detecting means coupled to the first detecting means for detecting an inclination change quantity between a direction of a transition edge of a picture element on an object scanning line and a direction of a transition edge of a picture element on a reference scanning line which precedes the object scanning line, and coding means coupled to the second detecting means for coding the inclination change quantity into a directional change code which is output as a compressed image data of the input image data. According to the facsimile machine of the present invention, it is possible to effectively improve the compression rate of the existing facsimile machine by making a simple modification.

Other objects and further features of the present invention will be apparent from the following detailed description when read in conjunction with the accompanying drawings.

DESCRIPTION OF THE PREFERRED EMBODIMENTS

Figure 1:
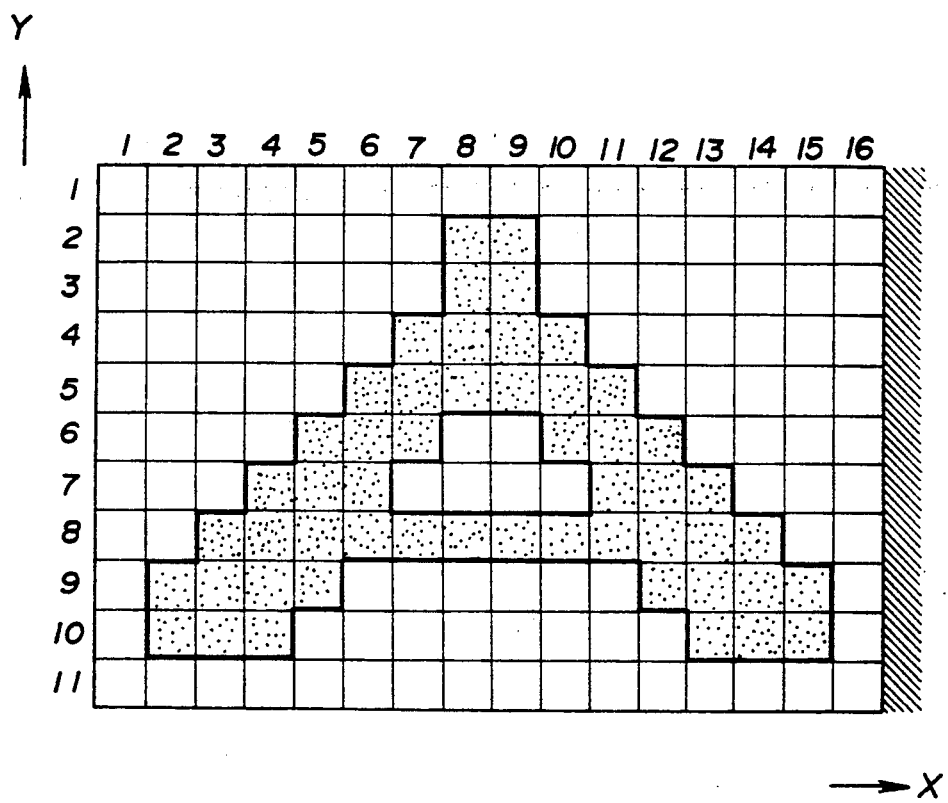
FIG. 1 shows an example of a graphic on a screen which is subjected to a data compression when making an image data transmission.
Figure 2:
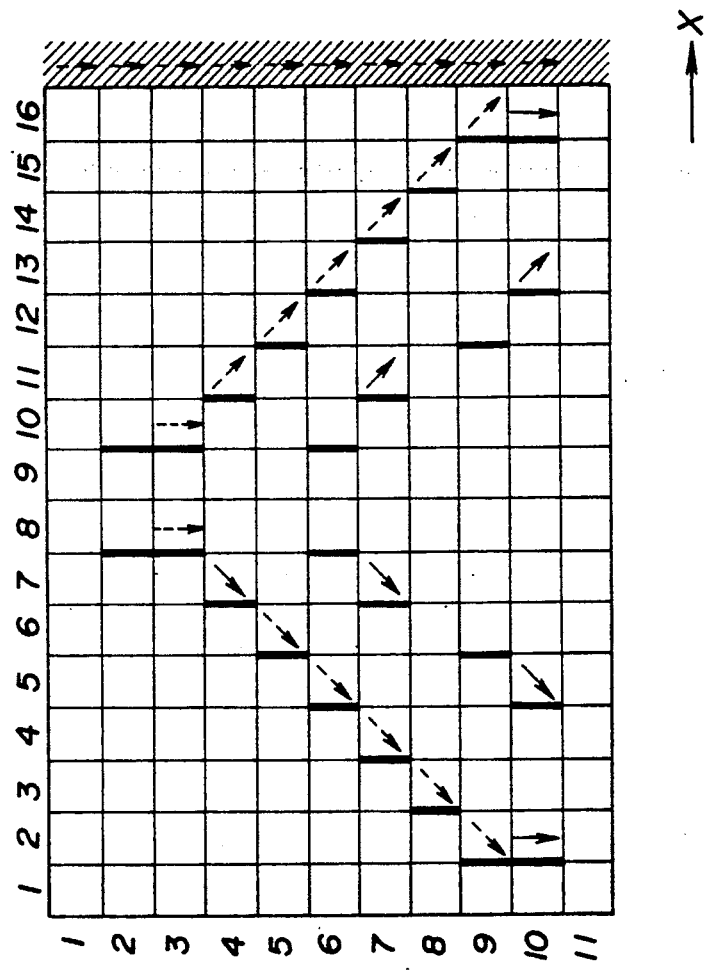
FIG. 2 is a diagram for explaining a principle of an image data compression system according to the present invention.

FIG. 2 is a diagram for explaining a principle of an image data compression system according to the present invention when transmitting the pattern of the character "A" shown in FIG. 1. In FIG. 2, an arrow indicates inclination change information which is required when transmitting the image data of the pattern. When a direction of a transition edge (indicated by a bold vertical line) of a picture element on a reference scanning line and a direction of the transition edge of the picture element on an object scanning line are different, it is necessary to transmit inclination change information corresponding to the arrow indicated by a solid line. On the other hand, when the direction of the transition edge of the picture element on the reference scanning line and the direction of the transition edge of the picture element on the object scanning line are the same, it is sufficient to transmit an information indicating that there is no change in the inclination of the transition edge as indicated by a phantom arrow. For example, a code D(0) which is assigned a minimum code length as will be described later may be transmitted as the information indicating that there is no change in the inclination of the transition edge. There is no need to transmit two kinds of data respectively indicating a value of the shift quantity (that is, a difference between the X-axis addresses) of the transition edge of the picture element and a direction of the shift as in the case of the MR coding scheme.

The following Table 3 shows an example of the image data of the pattern of the character "A" shown in FIG. 1 compressed by the image data compression system according to the present invention.

TABLE 3

| Line No. | Code Sequence | No. of Bits |
|---|---|---|
| 1 | D(0) | 1 |
| 2 | H{W(7)B(2)}D(0) | 10 |
| 3 | D(0)D(0)D(0) | 3 |
| 4 | DL(1)DR(1)D(0) | 7 |
| 5 | D(0)D(0)D(0) | 7 |
| 6 | D(0)H{B(3)W(2)}D(0)D(0) | 16 |
| 7 | D(0)DL(1)DR(1)D(0)D(0) | 13 |
| 8 | D(0)PD(0)D(0) | 11 |
| 9 | D(0)H{B(4)W(6)}D(0)D(0) | 17 |
| 10 | DR(1)DL(1)DR(1)DL(1)D(0) | 13 |
| 11 | PP | 8 |

In the Table 3, the code name "V" of the MR (vertical) coding scheme is replaced by a code name "D" to indicate that it is an inclination change code. The codes V(0), VR(m) and VL(m) of the MR coding scheme shown in the Table 1 can respectively be used as the inclination change codes D(0), DR(m) and DL(m) of the coding scheme shown in the Table 3. In the Table 3, each number under the column "No. of Bits" indicates the number of bits for the case where each of the codes shown in the Table 1 are replaced by the inclination change codes used in the present invention.

A total number of bits under the column "No. of Bits" in the Table 3 is "85" as opposed to "102" in the Table 1. Since 102/85=1.2, it is readily seen that the transmission efficiency is improved by 20% according to the present invention. The compression rate in the present invention for the pattern shown in FIG. 1 is (16×11)/85=2.1 and is considerably improved compared to (16×11)/102=1.73 obtained by the MR coding scheme.

Figure 3:
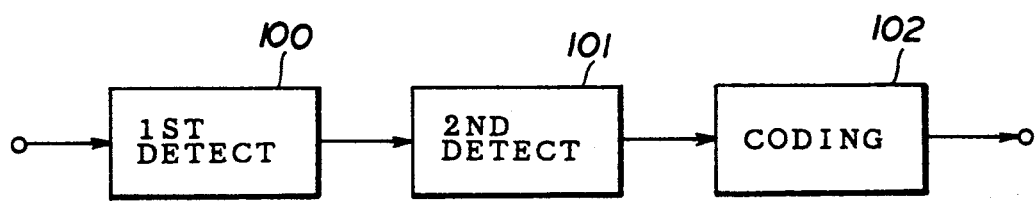
FIG. 3 is a system block diagram showing an embodiment of the image data compression system according to the present invention.

FIG. 3 shows an embodiment of the image data compression system according to the present invention. The image data compression system comprises a first detecting part 100, a second detecting part 101, and a coding part 102. The first detecting part 100 is supplied with an input image data and detects a transition edge of a picture element on a scanning line where the picture element undergoes a transition from white to black or vice versa. The second detecting part 101 is coupled to the first detecting part 100 and detects an inclination change quantity between a direction of a transition edge of a picture element on an object scanning line and a direction of a transition edge of a picture element on a reference scanning line which precedes the object scanning line. The coding part 102 is coupled to the second detecting part 101 and codes the inclination change quantity into an inclination change code which is output as a compressed image data of the input image data.

Next, a description will be given of a facsimile machine which is applied with the embodiment of the image data compression system according to the present invention which uses the inclination change code.

Figure 4:
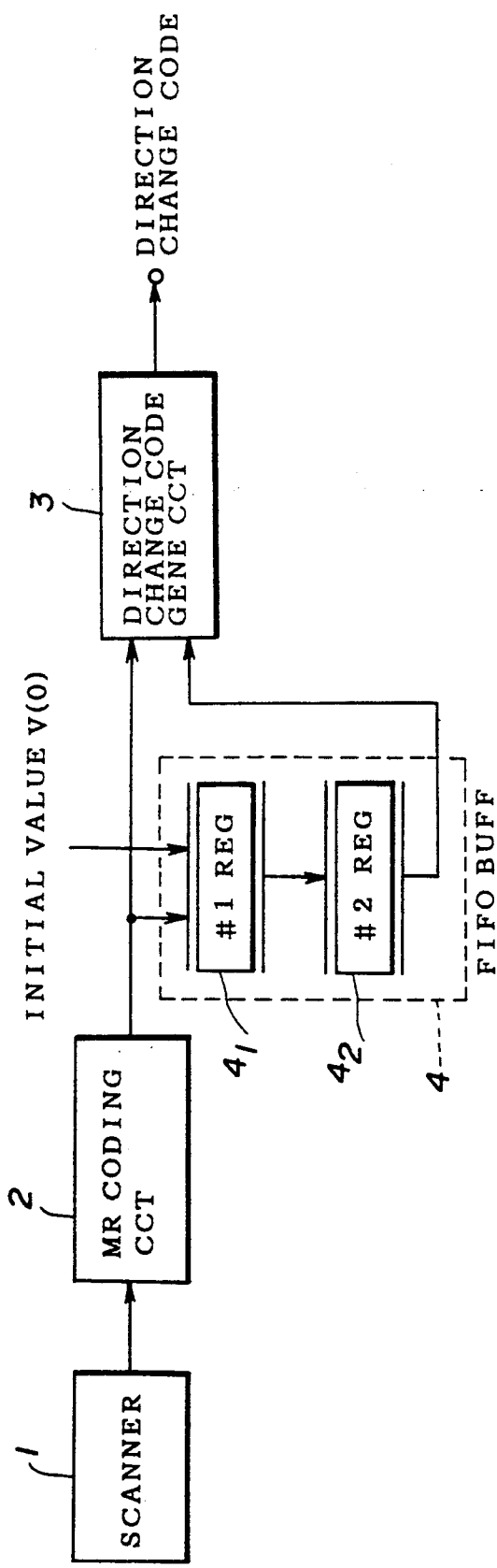
FIG. 4 is a system block diagram showing an essential part of a transmission system of a facsimile machine applied with the embodiment of the image data compression system according to the present invention.

FIG. 4 shows an essential part of a transmission system of the facsimile machine. In addition to the known means constituting the transmission system of the facsimile machine, a means is provided to obtain the inclination change code. As in the case of an existing facsimile machine, a scanner 1 reads a document image and supplies an image data to an MR coding circuit 2. The MR coding circuit 2 codes the image data in conformance with the MR coding scheme and supplies a coded image data related to an object scanning line to an inclination change code generating circuit 3 and a first stage register 4₁ of a first-in-first-out (FIFO) buffer 4 which is made up of two stages of registers 4₁ and 4₂.

When the first stage register 4₁ of the FIFO buffer 4 receives a code sequence related to a first scanning line from the MR coding circuit 2, an initial value V(0) is transferred to the second stage register 4₂ because a code corresponding to V(0) is prestored in the first stage register 4₁ as the initial value. In addition, when the image data related to second and subsequent scanning lines are supplied to the first stage register 4₁, the code sequence of the previous scanning line, that is, the reference scanning line, is transferred to the second stage register 4₂.

The inclination change code generating circuit 3 compares the code sequence which is related to the object scanning line and is received from the MR coding circuit 2 and the code sequence which is related to the reference scanning line and is received from the second stage register 4₂ of the FIFO buffer 4. From this comparison, the inclination change code generating circuit 3 obtains a shift quantity (n) of the corresponding MR (vertical) codes V(0), VR(m) and VL(m) and replaces these MR codes by inclinational change codes D(0), DR(n) and DL(n) which correspond to the shift quantity (n), that is, the inclinational change quantity. The directional change codes are generated and output from the inclinational change code generating circuit 3 so that the other horizontal codes and the like are maintained as they are.

For example, the inclinational change code generating circuit 3 comprises a ROM table shown in the following Table 4. In the Table 4, the codes under the columns "Before" and "Now" respectively denote output codes of the FIFO buffer 4 and the MR coding circuit 2. The codes under the columns "Result" and "Code" respectively denote the inclinational change code which is generated and the corresponding code which is output from the inclinational change code generating circuit 3. For example, the transmission system shown in FIG. 4 is controlled by a central process unit (CPU, not shown), and the access to the ROM table can be controlled by the CPU. Further, the CPU can carry out a control to generate a code VR(3) to indicate a mode change code from the MR code to the inclinational change code, and a code VL(3) to indicate a mode change code from the inclinational change code to the MR code.

TABLE 4

| Before | Now | Result | Code |
| --- | --- | --- | --- |
| VR(1) | VR(1) | D(0) | V(0) |
|  | V(0) | DL(1) | VL(1) |
|  | VL(1) | DL(2) | VL(2) |

TABLE 4-continued

| Before | Now | Result | Code |
| --- | --- | --- | --- |
| V(0) | VR(1) | DR(1) | VR(1) |
|  | V(0) | D(0) | V(0) |
|  | VL(1) | DL(1) | VL(1) |
| VL(1) | VR(1) | DR(2) | VR(2) |
|  | V(0) | DR(1) | VR(1) |
|  | VL(1) | DR(0) | VR(0) |
| Else | Else | MR | MR |

In FIG. 4, the MR coding circuit 2 corresponds to the first detecting part 100 shown in FIG. 3. The FIFO buffer 4 and a portion of the direction change code generating circuit 3 correspond to the second detecting part 101. In addition, a remaining portion of the inclinational change code generating circuit 3 corresponds to the coding part 102.

Figure 5:
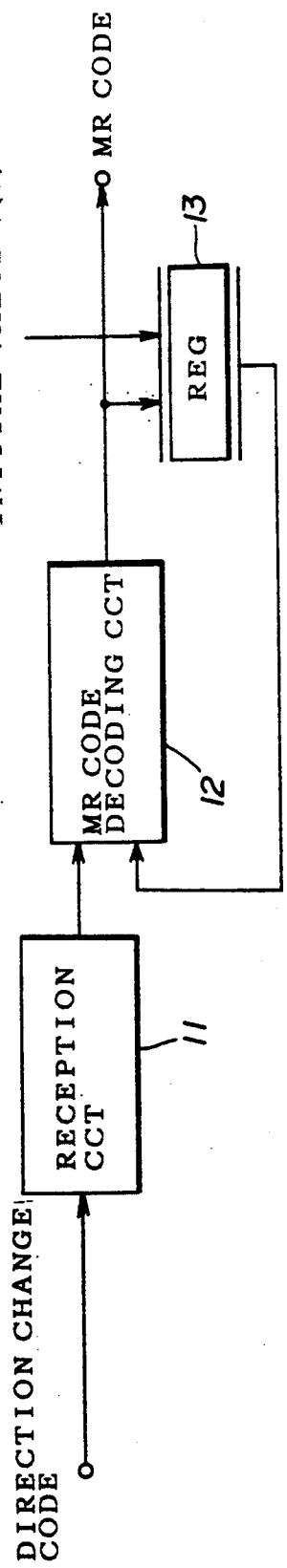
FIG. 5 is a system block diagram showing an essential part of a reception system of the facsimile machine applied with the embodiment of the image data compression system according to the present invention.

FIG. 5 shows an essential part of a reception system of the facsimile machine. In addition to the known means constituting the reception system of the facsimile machine, a means is provided to decode the inclinational change code. A reception circuit 11 receives the inclinational change code and supplies the inclinational change code to an MR code decoding circuit 12. A code corresponding to V(0) is prestored in a register 13 as an initial value, and this initial value is also supplied to the MR code decoding circuit 12. The MR code decoding circuit 12 compares the inclinational change code sequence which is related to the object scanning line and is received from the reception circuit 11 and the MR code sequence which is related to the reference scanning line and is received from the register 13. By this comparison, the MR code decoding circuit 12 converts the directional change code into an MR code. This conversion can easily be carried out by adding a shift quantity indicated by the inclinational change codes D(0), DR(m) and DL(m) to the MR (vertical) codes V(0), VR(n) and VL(n).

For example, a ROM table similar to that shown in the Table 4 may be used to convert the inclinational change code to the MR code. For example, the reception system shown in FIG. 5 is controlled by a central process unit (CPU, not shown), and the access to the ROM table can be controlled by the CPU. Further, the CPU can carry out a control responsive to the mode change codes VR(3) and VL(3) described above.

The MR code sequence obtained in the MR code decoding circuit 12 is stored in the register 13 for use as a code sequence related to a reference scanning line when decoding the next scanning line. In addition, the MR code sequence obtained in the MR code decoding circuit 12 is supplied to a plotter (not shown), for example, which records a received image.

As may be seen from FIGS. 4 and 5, the image data transmission employing the image data compression system according to the present invention can be realized by simply adding the FIFO buffer 4 and the inclinational change code generating circuit 3 shown in FIG. 4 to the transmission system of the existing facsimile machine and adding the MR code decoding circuit 12 and the register 13 shown in FIG. 5 to the reception system of the existing facsimile machine. It is thus possible to realize an image data transmission having a high transmission efficiency by making a simple modification of the existing facsimile machine which uses the MR coding scheme.

As may be seen from FIG. 1, in a character or pattern, the shift quantity of the transition edges of the picture elements on two mutually adjacent scanning lines is a constant value in many cases. Accordingly, the data quantity can be reduced even more notably in the case of a Chinese character (kanji) compared to alphanumeric characters.

Therefore, in the present invention, a inclinational change quantity between a direction of a transition edge of a picture element on an object scanning line and a direction of a transition edge of a picture element on a reference scanning line is coded and transmitted so as to reduce the data (information) quantity which needs to be transmitted. In addition, it is possible to further reduce the data quantity which needs to be transmitted by assigning a minimum number of bits for a code which is transmitted when a shift quantity between the transition edges of the picture elements on the two mutually adjacent scanning lines is the same.

Further, the present invention is not limited to these embodiments, but various variations and modifications may be made without departing from the scope of the present invention.

What is claimed is:

1. An image data compression system comprising:
    first detecting means supplied with an input image data for detecting a transition edge of a picture element on a scanning line where the picture element undergoes a transition from white to black or vice versa;
    second detecting means coupled to said first detecting means for detecting any change in the inclination which is denominated as a inclination change quantity between a direction of a transition edge of a picture element on an object scanning line and a direction of a transition edge of a picture element on a reference scanning line which precedes said object scanning line; and
    coding means coupled to said second detecting means for coding said direction change quantity into a inclination change code which is output as a compressed image data of said input image data.

2. The image data compression system as claimed in claim 1 wherein said coding means generates as said inclination change code a code V(0) of a modified READ coding scheme when said inclination change quantity is zero and generates codes VR(n) and VL(n) of the modified READ coding scheme when said inclination change quantity is ±n, where V(0) indicates that a shift quantity of a horizontal address of the transition edge on the object scanning line when compared with a horizontal address of the transition edge on the reference scanning line is zero, VR(n) indicates a shift quantity n to the right of an image described by said input image data and VL(n) indicates a shift quantity n to the left of the image described by said input image data.

3. The image transmission system as claimed in claim 1 wherein said first and second means generate a vertical code with respect to said object scanning line and a vertical code with respect to said reference scanning line, said coding means generating said inclinational change code by coding a difference between the vertical code with respect to said object scanning line and the vertical code with respect to said reference scanning line.

4. The image data compression system as claimed in claim 3 wherein said vertical code is a modified READ code.

5. A facsimile machine comprising:
    reading means for reading a document image and outputting an input image data;
    first detecting means supplied with said input image data for detecting a transition edge of a picture element on a scanning line where the picture element undergoes a transition from white to black or vice versa;
    second detecting means coupled to said first detecting means for detecting any change in the inclination which is denominated as a inclination change quantity between a direction of a transition edge of a picture element on an object scanning line and a direction of a transition edge of a picture element on a reference scanning line which precedes said object scanning line; and
    coding means coupled to said second detecting means for coding said direction change quantity into a inclination change code which is output as a compressed image data of said input image data.

6. The facsimile machine as claimed in claim 5 wherein said coding means generates as said inclinational change code a code V(0) of a modified READ coding scheme when said inclination change quantity is zero and generates codes VR(n) and VL(n) of the modified READ coding scheme when said inclination change quantity is ±n, where V(0) indicates that a shift quantity of a horizontal address of the transition edge on the object scanning line when compared with a horizontal address of the transition edge on the reference scanning line is zero, VR(n) indicates a shift quantity n to the right of an image described by said input image data and VL(n) indicates a shift quantity n to the left of the image described by said input image data.

7. The image transmission system as claimed in claim 5 wherein said first and second means generate a vertical code with respect to said object scanning line and a vertical code with respect to said reference scanning line, said coding means generating said inclinational change code by coding a difference between the vertical code with respect to said object scanning line and the vertical code with respect to said reference scanning line.

8. The image data compression system as claimed in claim 7 wherein said vertical code is a modified READ code.

9. The facsimile machine as claimed in claim 5 wherein said first detecting means comprises a modified READ coding circuit.

10. The facsimile machine as claimed in claim 9 wherein said second detecting means includes register means coupled to said first detecting means for storing the transition edge of the reference scanning line.

* * * * *